Nov. 17, 1959 J. P. BORDA ET AL 2,913,286
END LUBRICATING BEARING
Filed July 20, 1956
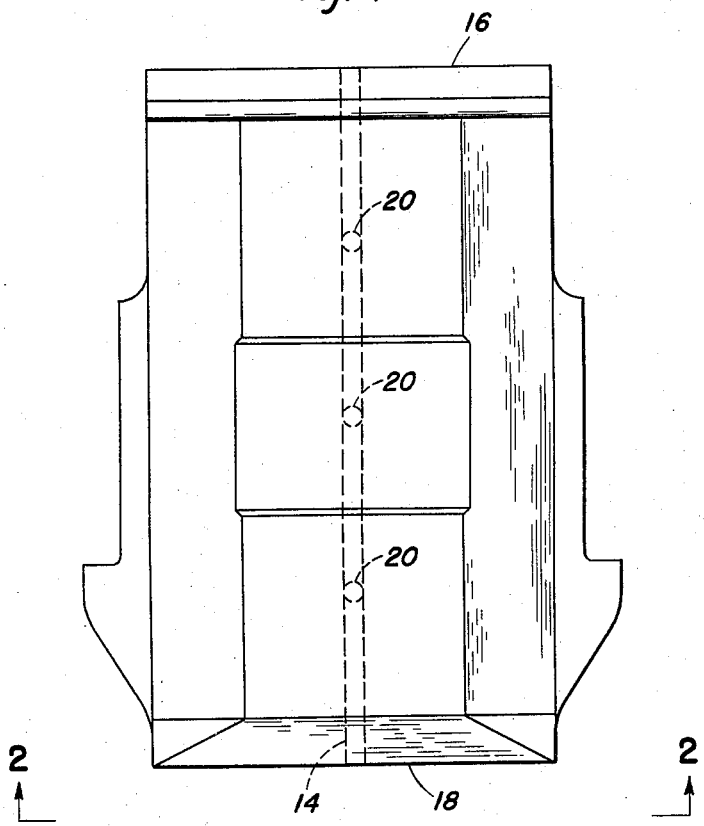
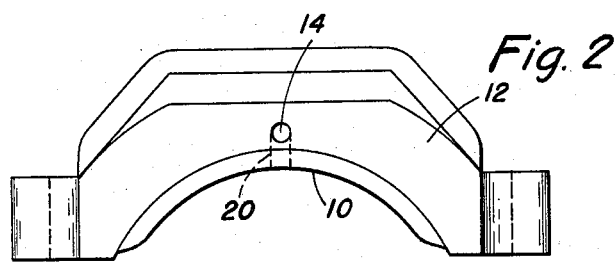
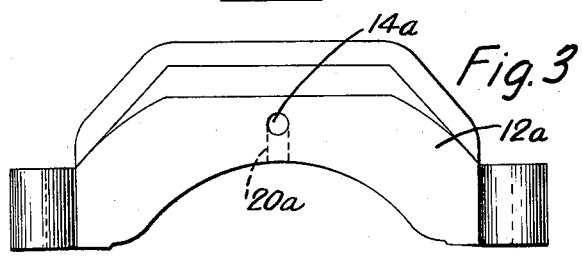
INVENTORS
John A. Mardick
John P. Borda
BY
ATTORNEY

2,913,286
Patented Nov. 17, 1959

2,913,286
END LUBRICATING BEARING

John P. Borda, East Orange, N.J., and John A. Mardick, Queens Village, N.Y., assignors to National Lead Company, New York, N.Y., a corporation of New Jersey Application July 20, 1956, Serial No. 599,131

5 Claims. (Cl. 308—79.1)

This invention relates to the lubrication of journal bearings. More specifically, it relates to an improved design of railway journal bearings which provides for lubrication of the collar and plain ends of the bearing.

When employing the conventional journal bearings as are presently used on railway rolling stock only the bore of the journal bearing and the axle is lubricated. This is usually accomplished by the revolution of the axle while in contact with an oil supply, such as for example oil-saturated waste which is positioned in the lower section of the journal box. The revolving axle carries a film of oil which lubricates the main contacting surfaces of the axle and journal bearing.

The axle, however, has a collar and wheel radius between which points the journal bearing is confined. Due to the lateral motion of the railway cars on curves and because of shifting loads, the collar and plain ends of the journal bearing are subjected to wear and friction which necessitates repair of replacement of the bearing often much before the main bearing surface shows any significant indication of deterioration.

Accordingly, an object of the instant invention is to provide a design of journal bearing which will permit lubrication of the ends of the bearing. Another object is to provide a journal bearing so designed as to further utilize the conventional oil source not only to lubricate the main bearing surface but also to lubricate the plain and collar ends of the bearing. These and other objects of the invention will become more apparent from the description and from the drawings wherein:

Fig. 1 is a top view of a journal bearing constructed according to the instant invention and wherein:

Fig. 2 is an end view of the bearing taken along line 2—2 of Fig. 1.

Fig. 3 is an end view of a bearing of the so-called "unlined" type as is subsequently referred to in this description.

Referring now to the drawings, the bearing has an anti-friction lining 10 which may be of Babbitt or other anti-friction metal as is known to the art. The bearing body 12 is usually made of bronze alloy or the like. A hole or channel 14 is bored or otherwise formed in the body of the bearing, said channel being longitudinally positioned in said body slightly above the anti-friction metal and opening to the ends 16 and 18 of the bearing. According to a preferred embodiment the channel is positioned in the center of the bearing. A duct 20 which is bored through the anti-friction lining 10 connects with the longitudinally positioned channel 14. If desired a plurality of such ducts may be employed; however, one duct has been found to be quite satisfactory. The opening of the duct in the anti-friction lining should be positioned in what is generally referred to as the "load zone" of the bearing. This is a zone extending approximately three quarters of an inch to either side of the longitudinal center line of the bearing. Obviously, the exact dimensions of load-zone may vary somewhat depending on the size of the bearing and the curvature of the bearing surface. It has been established that extremely high hydraulic oil pressure is built up in the load zone when the axle is rotating, for example, pressures around five thousand pounds per square inch have been measured. Under such conditions of high hydraulic pressure some of the lubricating oil carried by the axle is forced into duct 20, through channel 14 and out the openings in the ends of the bearing. The oil coats the bearing ends thus lubricating the end surfaces and decreasing the amount of wear and friction. Although the duct or ducts 20 may be positioned other than normal to the channel 14, and still be effective in conveying oil thereto, it is to be appreciated that the most favorable position when considering the problems of machining or boring is to have the duct 20 normal to the channel 14.

Many journal bearings in use today are of the so-called "unlined" type. These are usually cast of aluminum alloy or the like and the main bearing surface is of the same metal as the bearing body. The instant construction is just as applicable to this type of bearing as it is to the "lined" type shown in the drawing. Fig. 3 is an example of an "unlined" type of bearing embodying the instant construction showing duct 20$^a$ normal to channel 14$^a$ as incorporated in bearing body 12$^a$ which may be typically cast in its entirety of aluminum alloy.

It will be seen that the instant bearing construction provides means for simple and effective conveyance of oil not only to the main bearing surface but also over the ends of the bearing.

While the invention has been set forth in the foregoing description and illustrated in the drawings it is not necessarily restricted thereto and what it is intended to cover is that within the scope of the claims.

We claim:

1. A journal bearing of the class described including a bearing body and a main bearing surface and having an internal bore positioned in the bearing body generally along its longitudinal center line and open to both ends of said bearing, and at least one duct bored through the main bearing surface and connecting with the longitudinally positioned bore, the duct having an opening in said bearing surface, said opening being positioned in the "load zone" of the bearing surface.

2. A journal bearing according to claim 1 having a plurality of ducts bored through the main bearing surface and connected with the bore.

3. A journal bearing according to claim 1 wherein said duct is positioned generally normal to said bore.

4. A journal bearing according to claim 1 wherein said bearing is of the lined type.

5. A journal bearing according to claim 1 wherein the bearing surface is of the same metal as the bearing body.

References Cited in the file of this patent

UNITED STATES PATENTS

| | | |
|---|---|---|
| 809,635 | Schrader | Jan. 9, 1906 |
| 1,914,637 | Hennessy | June 20, 1933 |
| 1,935,114 | Davis et al. | Nov. 14, 1933 |

FOREIGN PATENTS

| | | |
|---|---|---|
| 669,563 | France | Oct. 5, 1929 |